United States Patent
Han et al.

(10) Patent No.: US 7,517,133 B2
(45) Date of Patent: Apr. 14, 2009

(54) CHASSIS, BACKLIGHT ASSEMBLY HAVING THE SAME AND LIQUID CRYSTAL DISPLAY DEVICE HAVING THE SAME

(75) Inventors: Byung-Woong Han, Incheon (KR); Kyu-Seok Kim, Yongin-si (KR); Young-Bee Chu, Suwon-si (KR); Sang-Hee Lee, Yongin-si (KR); Young-Hee Park, Busan (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 176 days.

(21) Appl. No.: 11/269,228

(22) Filed: Nov. 8, 2005

(65) Prior Publication Data
US 2006/0152647 A1 Jul. 13, 2006

(30) Foreign Application Priority Data
Jan. 11, 2005 (KR) .................... 10-2005-0002591

(51) Int. Cl.
*F21V 8/00* (2006.01)

(52) U.S. Cl. ...................... 362/632; 362/634
(58) Field of Classification Search ............... 362/257, 362/609
See application file for complete search history.

(56) References Cited

U.S. PATENT DOCUMENTS

| 6,773,141 | B2 * | 8/2004 | Zhao et al. .................. 362/257 |
| 6,880,947 | B2 * | 4/2005 | Hsieh et al. ................. 362/614 |
| 7,131,750 | B2 * | 11/2006 | Liu et al. .................... 362/327 |

* cited by examiner

*Primary Examiner*—Anabel M Ton
(74) *Attorney, Agent, or Firm*—F. Chau & Associates, LLC

(57) ABSTRACT

A backlight assembly comprises a light source, and a chassis that receives the light source, wherein the chassis includes a body layer, a metal reflecting layer formed on the body layer to reflect light generated from the light source, an adhesive layer formed between the body layer and the metal reflecting layer, and a protecting layer formed on the metal reflecting layer.

37 Claims, 3 Drawing Sheets

$N_1 > N_2$ $N_1 > N_2$ $N_1 > N_2 > N_3 > N_4 > N_5 > N_6$

CHASSIS, BACKLIGHT ASSEMBLY HAVING THE SAME AND LIQUID CRYSTAL DISPLAY DEVICE HAVING THE SAME

CROSS-REFERENCE TO RELATED APPLICATION

The present application claims priority from Korean Patent Application No. 2005-2591, filed on Jan. 11, 2005, the disclosure of which is incorporated herein by reference in its entirety.

BACKGROUND OF THE INVENTION

1. Technical Field

The present disclosure relates to a chassis, a backlight assembly having the chassis and a liquid crystal display (LCD) device having the chassis, and more particularly, to a chassis integrally formed with a reflecting layer, a backlight assembly having the chassis and an LCD device having the chassis.

2. Discussion of the Related Art

An LCD device is a flat panel display device. The LCD device displays an image using light. In the LCD device, arrangement of liquid crystal is varied in response to an electric field applied to the liquid crystal. Thus, light transmittance of the liquid crystal may be changed to display an image. The LCD device is a non-emissive display device that includes a backlight assembly that supplies an LCD panel of the LCD device with light. A portion of the light is irradiated toward the LCD panel, and remaining portion of the light is reflected from a reflecting sheet toward the LCD panel.

The LCD device includes, for example, an LCD panel, a backlight assembly, a bottom chassis, a light source, and a reflecting sheet. The bottom chassis supports the LCD panel and the backlight assembly. The light source provides the LCD panel with light. The light generated from the light source is reflected from the reflecting sheet.

When the LCD device includes the reflecting sheet, a manufacturing cost of the LCD device is increased. In addition, the reflecting sheet is combined with the bottom chassis through additional processes so that the manufacturing cost and time are increased. Furthermore, a yield of the LCD device is decreased, and a thickness of the backlight assembly is increased. Also, when the reflecting sheet is not aligned with respect to the bottom chassis, a portion of the light leaks through a space between the reflecting sheet and the bottom chassis.

SUMMARY OF THE INVENTION

Embodiments of the present invention provide a chassis integrally formed with a reflecting layer, a backlight assembly having the chassis, and an LCD device having the chassis.

A backlight assembly in accordance with an exemplary embodiment of the present invention includes a light source and a chassis. The chassis receives the light source. The chassis includes a body layer, a metal reflecting layer, an adhesive layer and a protecting layer. The metal reflecting layer is formed on the body layer to reflect light generated from the light source. The adhesive layer is formed between the body layer and the metal reflecting layer. The protecting layer is formed on the metal reflecting layer.

The chassis may include a bottom plate having the body layer, the adhesive layer, the metal reflecting layer and the protecting layer, and a sidewall that is extended from the bottom plate.

The adhesive layer may include a metal oxide.

A reflectivity of the metal reflecting layer may be not less than about 70%.

The metal reflecting layer may include silver, aluminum, platinum or an alloy thereof.

The protecting layer may include a metal oxide, and a transparency of the protecting layer is not less than about 85%.

The protecting layer may include a plurality of protecting layer portions that have a different refractive index from each other. The protecting layer may include a first protecting layer portion formed on the metal reflecting layer and a second protecting layer portion on the first protecting layer portion, and the first protecting layer portion may have a greater refractive index than the second protecting layer portion.

The protecting layer may have a multi-layered structure having the protecting layer portions alternately deposited.

A thickness of each of the protecting layer portions may be a function of n times $\lambda/2$, wherein $\lambda$ and n represent a wavelength of reflected light and an integer, respectively.

A thickness of an m-th protecting layer portion may be about n times $N_m/N_{m+1} \times \lambda/2$, wherein $N_m$, $N_{m+1}$, $\lambda$ and n represent a refractive index of the m-th protecting layer portion, a refractive index of an (m+1)-th protecting layer portion that is formed on the m-th protecting layer portion, a wavelength of reflected light and an integer, respectively. In addition, a thickness of an o-th protecting layer portion that is an outermost protecting layer portion contacting air may be about n times $N_o/N_{air} \times \lambda/2$, wherein $N_o$, $N_{air}$, $\lambda$ and n represent a refractive index of the o-th protecting layer portion, a refractive index of the air, a wavelength of reflected light and an integer, respectively.

A thickness of the protecting layer may be about 168 nm to about 405 nm. In particular, a thickness of the protecting layer may be about 337.5 nm.

A chassis having a bottom plate and a sidewall in accordance with an embodiment of the present invention includes a metal body layer, a metal reflecting layer, an adhesive layer and a protecting layer. The metal reflecting layer is formed on the metal body layer. The adhesive layer is formed between the metal body layer and the metal reflecting layer to attach the metal body layer to the metal reflecting layer. The protecting layer is formed on the metal reflecting layer. The protecting layer has a plurality of protecting layer portions that have different refractive indexes from each other.

The metal reflecting layer may include silver, aluminum, platinum or an alloy thereof.

The adhesive layer may include a metal oxide.

The protecting layer may include a first protecting layer portion adjacent to the metal reflecting layer and a second protecting layer portion on the first protecting layer portion, and the first protecting layer portion may have a greater refractive index than the second protecting layer portion.

The protecting layer may include a multi-layered structure having the protecting layer portions alternately deposited.

A thickness of each of the protecting layer portions may be a function of n times $\lambda/2$, wherein $\lambda$ and n represent a wavelength of reflected light and an integer, respectively.

A thickness of the protecting layer may be about 168 nm to about 405 nm. In particular, the thickness of the protecting layer may be about 337.5 nm.

The protecting layer may include a metal oxide.

An LCD device in accordance with an embodiment of the present invention includes a chassis, a light source and an LCD panel. The chassis includes a metal body layer, a metal reflecting layer, an adhesive layer and a protecting layer. The metal reflecting layer is formed on the metal body layer. The adhesive layer is formed between the metal body layer and the metal reflecting layer. The protecting layer is formed on the metal reflecting layer. The protecting layer has a plurality of protecting layer portions that have different refractive indexes from each other. The chassis receives the light source and the LCD panel.

The metal reflecting layer may include silver, aluminum, platinum or an alloy thereof.

The chassis may include a bottom plate having the metal body layer, the adhesive layer, the metal reflecting layer and the protecting layer, and a sidewall that is extended from the bottom plate.

The adhesive layer may include a metal oxide.

The protecting layer may include a first protecting layer portion adjacent to the metal reflecting layer and a second protecting layer portion on the first protecting layer portion, and the first protecting layer portion may have a greater refractive index than the second protecting layer portion.

The protecting layer may include a multi-layered structure having the protecting layer portions alternately deposited.

A thickness of each of the protecting layer portions may be a function of n times $\lambda/2$, wherein $\lambda$ and n represent a wavelength of reflected light and an integer, respectively.

A thickness of the protecting layer may be about 168 nm to about 405 nm. In particular, a thickness of the protecting layer may be about 337.5 nm.

The protecting layer may include a metal oxide.

BRIEF DESCRIPTION OF THE DRAWINGS

Preferred embodiments of the present disclosure can be understood in more detail from the following description taken in conjunction with the accompanying drawings in which.

DESCRIPTION OF PREFERRED EMBODIMENTS

Preferred embodiments of the present invention will be described below in more detail with reference to the accompanying drawings. The present invention may, however, be embodied in many different forms and should not be construed as limited to the embodiments set forth herein.

Figure 1:
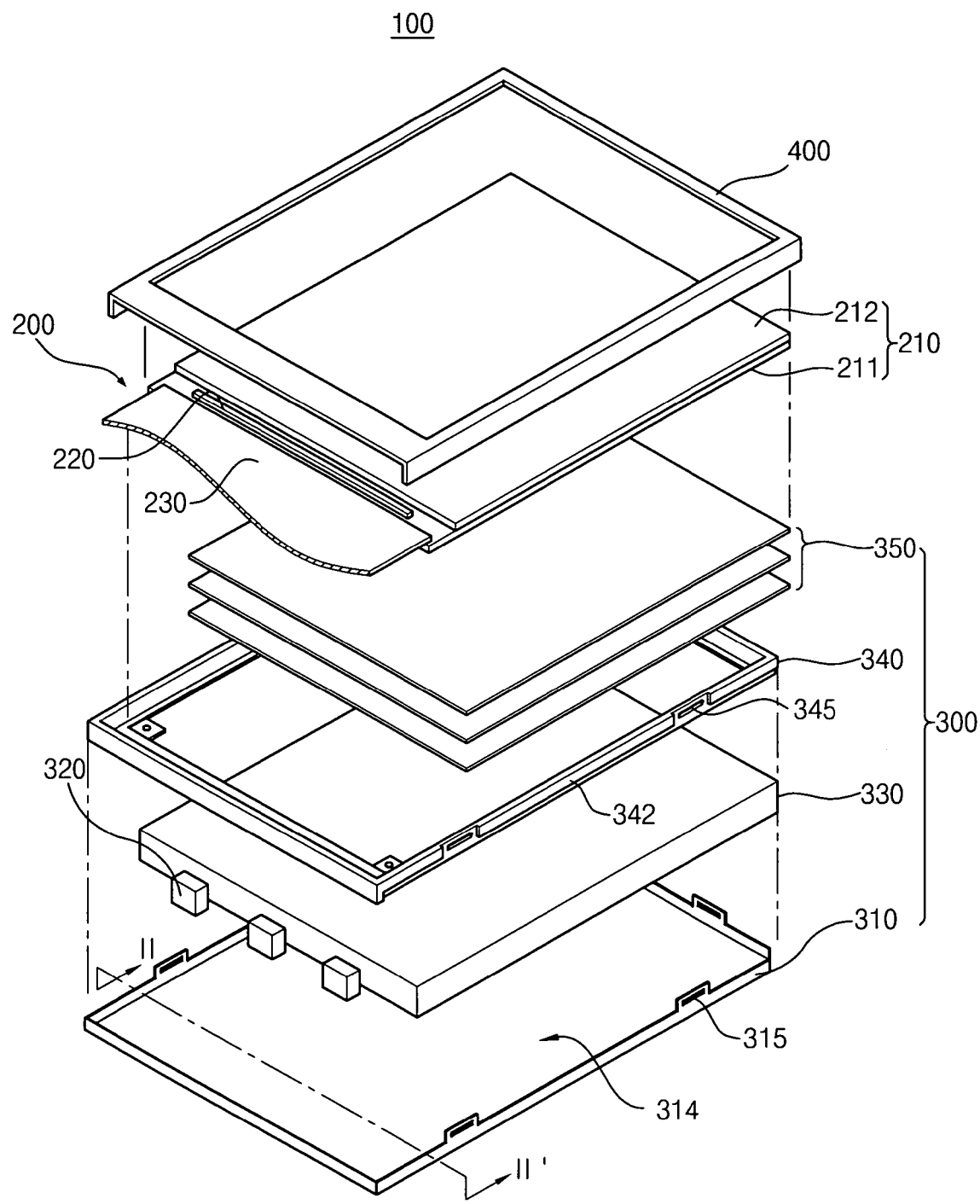
FIG. 1 is an exploded perspective view showing a liquid crystal display (LCD) device in accordance with an embodiment of the present invention.

FIG. 1 is an exploded perspective view showing a liquid crystal display (LCD) device in accordance with an embodiment of the present invention.

Referring to FIG. 1, the LCD device 100 includes an LCD panel assembly 200, a backlight assembly 300 and a top chassis 400. The LCD panel assembly 200 displays an image using light. The backlight assembly 300 generates the light to supply the LCD panel assembly 200 with the light. The top chassis 400 fixes the LCD panel assembly 200 to the backlight assembly 300.

The LCD panel assembly 200 includes an LCD panel 210, a driving chip 220 and a flexible circuit board 230. The image is displayed on the LCD panel 210.

The LCD panel 210 includes a thin film transistor (TFT) substrate 211, a color filter substrate 212 and a liquid crystal layer (not shown). The color filter substrate 212 is combined with the TFT substrate 211. The liquid crystal layer (not shown) is interposed between the TFT substrate 211 and the color filter substrate 212. Alternatively, the LCD panel 210 may include an array substrate that has a TFT and a color filter and a counter substrate that corresponds to the array substrate.

The TFT substrate 211 includes a plurality of gate lines (not shown), a plurality of data lines (not shown), a plurality of TFTs (not shown), a plurality of pixel electrodes (not shown) and a plurality of pixel regions (not shown) that are arranged in a matrix shape. Each of the pixel regions is defined by adjacent gate and data lines. The gate lines are arranged in a first direction. The data lines are arranged in a second direction that is substantially perpendicular to the first direction. A pixel electrode is electrically connected to a drain electrode of each of the TFTs.

The color filter substrate 212 includes a color filter (not shown) and a common electrode (not shown). The color filter includes a red color filter portion, a green color filter portion and a blue color filter portion. The common electrode is formed on the color filter.

Liquid crystal of the liquid crystal layer varies arrangement by an electric field applied to the liquid crystal layer so that light transmittance of the liquid crystal layer is changed. The electric field is formed by a voltage difference between the pixel electrode and the common electrode.

A driving chip 220 is mounted on the TFT substrate 211. The driving chip 220 applies driving signals to the data lines and the gate lines. In an embodiment, the driving chip 220 includes a chip for a data line and a chip for a gate line. Alternatively, the driving chip 220 may be an integrated chip. The driving chip 220 may be mounted on the TFT substrate 211 through a chip on glass (COG) process.

A flexible printed circuit board (FPC) 230 is electrically connected to an end portion of the TFT substrate 211 having the driving chip 220. The driving signal is applied to the driving chip 220 through the FPC 230. The FPC 230 is electrically connected to a printed circuit board (not shown) that includes, for example, a timing controller and a memory. The timing controller generates a timing signal to control a timing of the driving signal. A data signal is stored in the memory. The FPC 230 is electrically connected to the TFT substrate 211 through an anisotropic conductive film (ACF) (not shown).

The backlight assembly 300 is formed behind the LCD panel assembly 200 to supply the LCD panel 210 with the light having uniform luminance.

The backlight assembly 300 includes a bottom chassis 310, a light source 320, a light guiding plate 330, a frame 340 and an optical sheet 350. The bottom chassis 310 includes a reflecting layer so that a portion of the light generated from the light source 320 is reflected from the reflecting layer. In addition, the bottom chassis 310 supports the backlight assembly 300. The light source 320 generates light. The light guiding plate 330 guides the light generated from the light source 320 and guides the reflected light into the optical sheet 350. The frame 340 fixes the light source 320 and the light guiding plate 330 to the bottom chassis 310. The optical sheet 350 improves optical characteristics of the light exiting the light guiding plate 330. The light that has passed through the optical sheet 350 is irradiated into the LCD panel 210.

The light source 320 is adjacent to a side of the light guiding plate 330. The light generated from the light source 320 is irradiated into the light guiding plate 330. The light source 320 includes, for example, a light emitting diode (LED) and a fluorescent lamp. An inverter (not shown) is electrically connected to the light source 320 to control the light source 320. In an embodiment, the LCD device 100 includes three light sources 320 as shown in FIG. 1. The number of the light sources 320 may be changed based on, for example, a size and a total luminance of the LCD device 100. In addition, the light sources 320 may be adjacent to a plurality of sides of the light guiding plate 330. When the LCD device is a direct illumination type backlight assembly, the light guiding plate 330 may be omitted.

The light guiding plate 330 may include a plurality of patterns (not shown) to guide the light into an active region of the LCD panel 210 where the image is displayed.

The light source 320 is received in the bottom chassis 310 that is integrally formed with the reflecting layer. The remaining portion of the light generated from the light source 320 is reflected from the reflecting layer to improve luminance of the LCD device 100. According to embodiments of the present invention, the reflecting layer is integrally formed with the bottom chassis 310 to prevent a misalignment between the reflecting layer and the bottom chassis 310. Therefore, a fabricating process of the LCD device 100 is simplified to increase a yield of the LCD device 100.

The frame 340 presses sides of the light guiding plate 330 to fix the light guiding plate 330 to the bottom chassis 310. The frame 340 includes a bottom plate 341 having an opening and a sidewall 342. The sidewall 342 has a fixing protrusion 345 that corresponds to a fixing hole 315 of the bottom chassis 310. The frame 340 has a synthetic resin. The fixing protrusion 345 is inserted into the fixing hole 315 so that the frame 340 is combined with the bottom chassis 310.

The optical sheet 350 is positioned on the frame 340, and uniformizes the luminance of the light that has passed through the light guiding plate 330, thereby improving an image display quality.

The top chassis 400 is positioned on the LCD panel 210. The top chassis 400 has an opening corresponding to the active region of the LCD panel 210. The top chassis 400 covers the LCD panel 210, and is combined with the bottom chassis 310 or the frame 340 to fix the LCD panel 210 to the backlight assembly 300.

Figure 2:
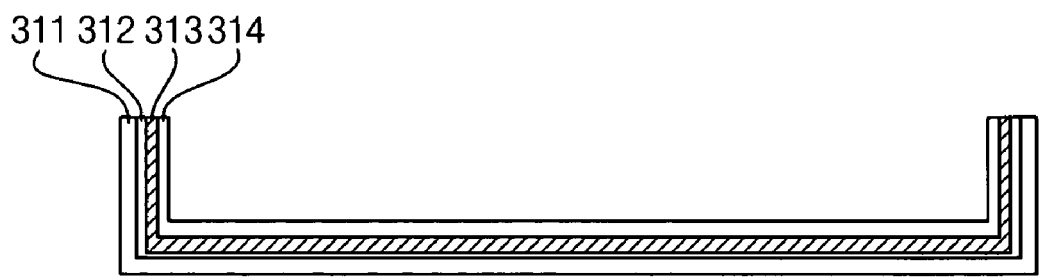
FIG. 2 is a cross-sectional view taken along the line II-II' shown in FIG. 1.

FIG. 2 is a cross-sectional view taken along the line II-II' shown in FIG. 1.

Referring to FIG. 2, the bottom chassis 310 includes a metal body layer 311, an adhesive layer 312 formed on the metal body layer 311, a metal reflecting layer 313 formed on the adhesive layer 312 and a protecting layer 314 formed on the metal reflecting layer 313. The protecting layer 314 protects the metal reflecting layer 313.

In an embodiment, the metal body layer 311 has an irregular surface that is formed through a surface treatment such as, for example, a chemical treatment or a corona treatment to increase an adhesive strength between the metal body layer 311 and the adhesive layer 312. In the corona treatment, electrons or ions of high energy are collided to the surface of the metal body layer 311 to change a surface energy of the surface to increase the adhesive strength. The adhesive layer 312 is formed on the irregular surface of the metal body layer 311 through, for example, a sputtering process or a vapor deposition process. The metal reflecting layer 313 is formed on the adhesive layer 312, and integrally formed with the metal body layer 311 via the adhesive layer 312.

The adhesive layer 312 attaches the metal body layer 311 to the metal reflecting layer 313. The adhesive layer 312 includes metal oxide such as, for example, titanium oxide, tin oxide, zinc oxide, or copper oxide. The adhesive layer 312 may also include a mixture of, for example, titanium oxide, tin oxide, zinc oxide, or copper oxide. When the adhesive layer 312 includes the metal oxide, the metal oxide may be securely combined with the metal body layer 311 and the metal reflecting layer 313.

A reflectivity of the metal reflecting layer 313 is more than about 70%. The metal reflecting layer 313 includes, for example, silver (Ag), aluminum (Al), or platinum (Pt). These materials can be used alone or in a mixture thereof. For example, the metal reflecting layer 313 may have an alloy of silver (Ag), aluminum (Al), and platinum (Pt). The metal reflecting layer 313 may be formed on the adhesive layer 312 through, for example, a sputtering process or a vapor deposition process. The adhesive layer 312 formed through the sputtering process has more uniform surface than the adhesive layer 312 formed through the vapor deposition process.

The protecting layer 314 protects the metal reflecting layer 313 from, for example, oxidation, a nd includes a metal oxide such a s, for example, titanium oxide, tin oxide, zinc oxide, or copper oxide. The protecting layer 314 may also include a mixture of, for example, titanium oxide, tin oxide, zinc oxide, or copper oxide. The protecting layer 314 is formed through, for example, a sputtering process or a vapor deposition process. A transparency of the metal reflecting layer 313 is no less than about 85%.

A thickness 'd' of the protecting layer 314 is determined by a wavelength of the light. When the wavelength of the light is $\lambda$, the thickness 'd' of the protecting layer 314 is n times $\lambda/2$ to increase the reflectivity of the metal reflecting layer 313. The thickness 'd' of the protecting layer 314 is determined by following Equation 1, wherein $N_{air}$, N and n are a refractive index of an air, a refractive index of the protecting layer 314 and an integer, respectively.

$$d = n \times N/N_{air} \times \lambda/2 \qquad \text{Equation 1}$$

In an embodiment, visible light that has the wavelength $\lambda$ of about 300 nm to about 720 nm is reflected from the metal reflecting layer 313 that has the thickness 'd' of about 168.75 nm to about 405 nm. For example, green light that has the wavelength $\lambda$ of about 450 nm is reflected from the metal reflecting layer 313 that has the thickness 'd' of about 337.5 nm.

Alternatively, the protecting layer 314 may include a plurality of protecting layer portions that have different refractive indexes to improve the reflectivity of the bottom chassis 310.

Figure 3:
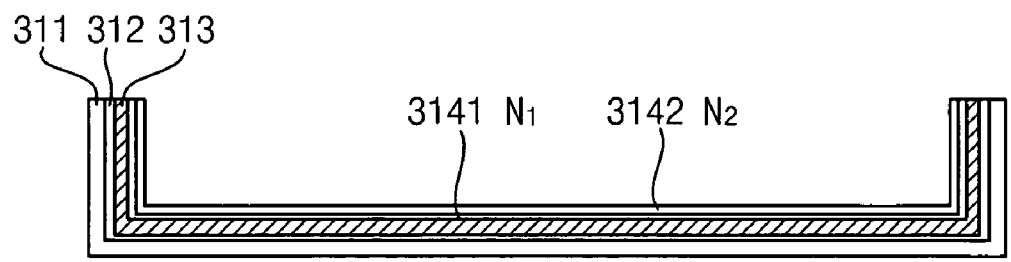
FIG. 3 is a cross-sectional view showing a bottom chassis in accordance with another embodiment of the present invention.

FIG. 3 is a cross-sectional view showing a bottom chassis in accordance with another embodiment of the present invention. The bottom chassis of the FIG. 3 is the same as in FIGS. 1 and 2 except with respect to a protecting layer.

Referring to FIG. 3, the protecting layer 314a of a bottom chassis 315 includes a first protecting layer portion 3141 and a second protecting layer portion 3142. The first and second protecting layer portions 3141 and 3142 have different refractive indexes. The number of the protecting layer portions may be changed. When the protecting layer 314a has a multi-layered structure, light is reflected from an interface between a metal reflecting layer 313 and the first protecting layer portion 3141 and an interface between the first and second protecting layer portions 3141 and 3142. In an embodiment, a first refractive index N1 of the first protecting layer portion 3141 is greater than a second refractive index N2 of the second protecting layer portion 3142 to improve a reflective index of a bottom chassis 310a.

Figure 4:
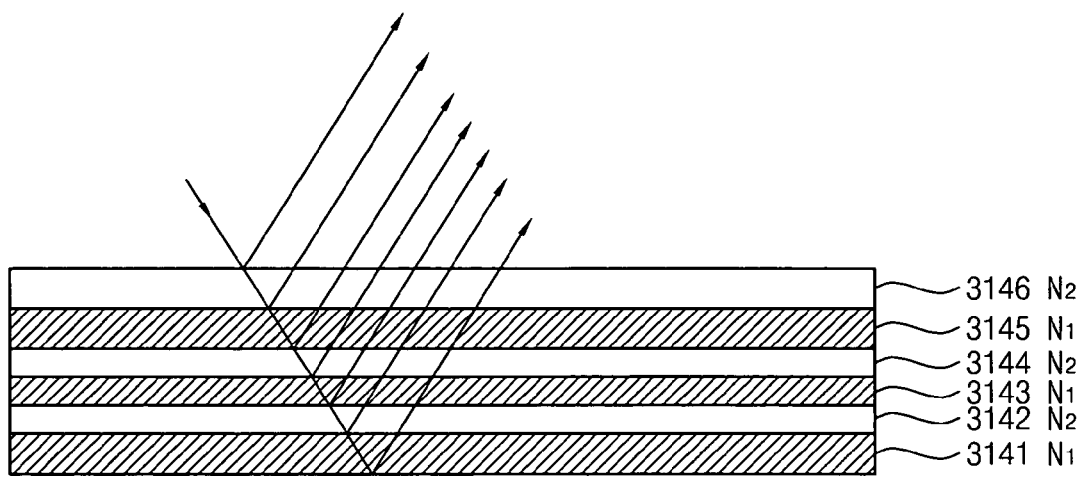
FIG. 4 is a cross-sectional view showing a protecting layer in accordance with an embodiment of the present invention.

FIG. 4 is a cross-sectional view showing a protecting layer in accordance with an embodiment of the present invention. An LCD device of FIG. 4 is the same as in FIGS. 1 and 2 except with respect to a protecting layer.

Referring to FIG. 4, the protecting layer 314b includes a first protecting layer portion 3141, a second protecting layer portion 3142 formed on the first protecting layer portion 3141, a third protecting layer portion 3143 formed on the second protecting layer portion 3142, a fourth protecting layer portion 3144 formed on the third protecting layer portion 3143, a fifth protecting layer portion 3145 formed on the fourth protecting layer portion 3144 and a sixth protecting layer portion 3146 formed on the fifth protecting layer portion 3145. Each of the first, third and fifth protecting layer portions 3141, 3143 and 3145 has a first refractive index $N_1$. Each of the second, fourth and sixth protecting layer portions 3142, 3144 and 3146 has a second refractive index $N_2$. The first refractive index $N_1$ is greater than the second refractive index $N_2$.

According to this embodiment, the first, third and fifth protecting layer portions 3141, 3143 and 3145 having the first refractive index $N_1$ and the second, fourth and sixth protecting layer portions 3142, 3144 and 3146 having the second refractive index $N_2$ are alternately deposited on a metal reflecting layer, for example, the metal reflecting layer 313 shown in FIG. 2, to increase a reflectivity of a bottom chassis.

Figure 5:
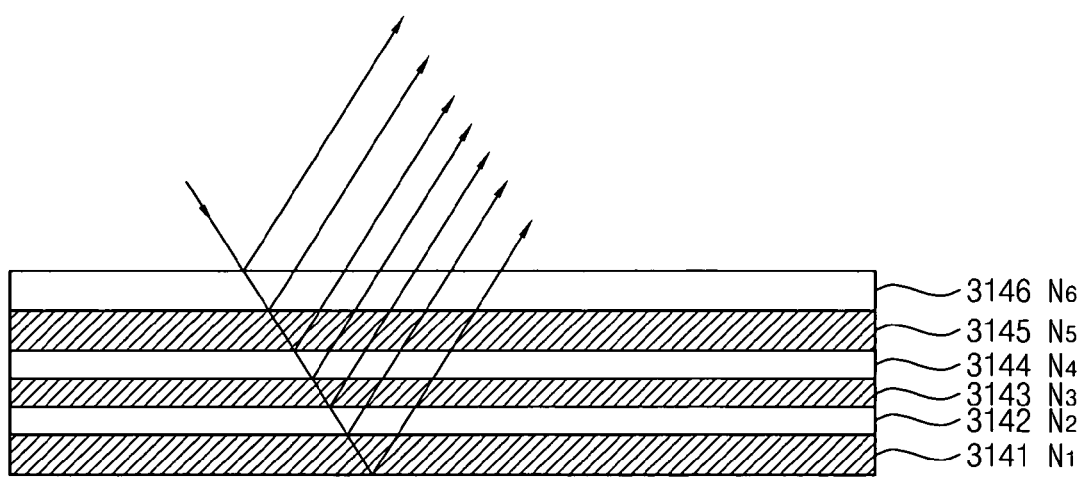
FIG. 5 is a cross-sectional view showing a protecting layer in accordance with another embodiment of the present invention.

FIG. 5 is a cross-sectional view showing a protecting layer in accordance with another embodiment of the present invention. An LCD device of FIG. 5 is the same as in FIGS. 1 and 2 except with respect to a protecting layer.

Referring to FIG. 5, the protecting layer 314c includes a first protecting layer portion 3141', a second protecting layer portion 3142' formed on the first protecting layer portion 3141', a third protecting layer portion 3143' formed on the second protecting layer portion 3142', a fourth protecting layer portion 3144' formed on the third protecting layer portion 3143', a fifth protecting layer portion 3145' formed on the fourth protecting layer portion 3144' and a sixth protecting layer portion 3146' formed on the fifth protecting layer portion 3145'. The first, second, third, fourth, fifth and sixth protecting layer portions 3141', 3142', 3143', 3144', 3145' and 3146' have a first refractive index $N_1$, a second refractive index $N_2$ that is smaller than the first refractive index $N_1$, a third refractive index $N_3$ that is smaller than the second refractive index $N_2$, a fourth refractive index $N_4$ that is smaller than the third refractive index $N_3$, a fifth refractive index $N_5$ that is smaller than the fourth refractive index $N_4$ and a six refractive index $N_6$ that is smaller than the fifth refractive index $N_5$, respectively.

According to this embodiment, the first, second, third, fourth, fifth and sixth refractive indexes $N_1$, $N_2$, $N_3$, $N_4$, $N_5$ and $N_6$ are different from one another to increase a reflectivity of a bottom chassis.

Referring again to FIGS. 4 and 5, an m-th thickness $d_m$ of the m-th protecting layer portion is determined by following Equation 2, wherein $N_m$ and $N_{m+1}$ are a refractive index of the m-th protecting layer portion and a refractive index of the (m+1)-th protecting layer portion that is formed on the m-th protecting layer portion, respectively.

$$d_m = n \times N_m / N_{m+1} \times \lambda / 2 \qquad \text{Equation 2}$$

An o-th thickness $d_o$ of the o-th protecting layer portion that is the outermost protecting layer portion contacting air is determined by following Equation 3, wherein $N_o$ and $N_{air}$ are a refractive index of the o-th protecting layer portion and a refractive index of the air, respectively.

$$d_o = n \times N_o / N_{air} \times \lambda / 2 \qquad \text{Equation 3}$$

In an embodiment, the adhesive layer 312, the metal reflecting layer 313 and the protecting layer 314 are sequentially formed on a metal plate (not shown). The metal plate having the adhesive layer 312, the metal reflecting layer 313 and the protecting layer 314 is then folded to form the bottom chassis 310.

According to embodiments of the present invention, the metal reflecting layer 313 is integrally formed with the chassis so that a reflectivity of a bottom surface of the chassis is substantially equal to that of a side surface of the chassis to uniformize the reflectivity of the reflecting layer. In addition, the light does not leak through the chassis, and the thickness of the backlight assembly is decreased. Furthermore, a manufacturing process of the backlight assembly is simplified to decrease a manufacturing cost of the backlight assembly.

Also, the thickness and the refractive index of the protecting layer 314 are optimized to maximize the reflectivity of the bottom chassis with respect to light having a predetermined wavelength.

Although preferred embodiments have been described with reference to the accompanying drawings, it is to be understood that the present invention is not limited to these precise embodiments but various changes and modifications can be made by one skilled in the art without departing from the spirit and scope of the present invention. All such changes and modifications are intended to be included within the scope of the invention as defined by the appended claims.

What is claimed is:

1. A backlight assembly comprising:
   a light source; and
   a chassis that receives the light source, the chassis including:
      a metal body layer;
      a metal reflecting layer formed on the metal body layer to reflect light generated from the light source;
      an adhesive layer formed between the metal body layer and the metal reflecting layer; and
      a protecting layer formed on the metal reflecting layer.

2. The backlight assembly of claim 1, wherein the chassis comprises a bottom plate having the metal body layer, the adhesive layer, the metal reflecting layer and the protecting layer formed thereon, and a sidewall that is extended from the bottom plate.

3. The backlight assembly of claim 1, wherein the adhesive layer comprises a metal oxide.

4. The backlight assembly of claim 1, wherein a reflectivity of the metal reflecting layer is not less than about 70%.

5. The backlight assembly of claim 1, wherein the metal reflecting layer comprises at least one of silver, aluminum, platinum, or an alloy thereof.

6. The backlight assembly of claim 1, wherein the protecting layer comprises a metal oxide, and a transparency of the protecting layer is not less than about 85%.

7. The backlight assembly of claim 1, wherein the protecting layer comprises a plurality of protecting layer portions that have different index from each other.

8. The backlight assembly of claim 7, wherein the protecting layer comprises a first protecting layer portion formed on the metal reflecting layer and a second protecting layer portion formed on the first protecting layer portion, and wherein the first protecting layer portion has a greater refractive index than the second protecting layer portion.

9. The backlight assembly of claim 7, wherein the protecting layer comprises a multi-layered structure having the protecting layer portions alternately deposited.

10. The backlight assembly of claim 8, wherein the protecting layer comprises a multi-layered structure having an additional first protecting layer portion formed on the second protecting layer portion and an additional second protecting layer portion formed on the additional first layer protecting portion.

11. The backlight assembly of claim 7, wherein a thickness of each of the protecting layer portions is a function of n times $\lambda/2$, where $\lambda$ and n represent a wavelength of reflected light and an integer, respectively.

12. The backlight assembly of claim 1, wherein a thickness of the protecting layer is about n times $\lambda/2$, where $\lambda$ and n represent a wavelength of reflected light and an integer, respectively.

13. The backlight assembly of claim 1, wherein a thickness of the protecting layer is about 168 nm to about 405 nm.

14. The backlight assembly of claim 13, wherein a thickness of the protecting layer is about 337.5 nm.

15. A chassis having a bottom plate and a sidewall, the chassis including:
   a metal body layer formed on the bottom plate;
   a metal reflecting layer formed on the metal body layer;
   an adhesive layer formed between the metal body layer and the metal reflecting layer; and
   a protecting layer formed on the metal reflecting layer, wherein the protecting layer includes a plurality of protecting layer portions that have different refractive indexes from each other.

16. The chassis of claim 15, wherein the metal reflecting layer comprises at least one of silver, aluminum, platinum or an alloy thereof.

17. The chassis of claim 15, wherein the adhesive layer comprises a metal oxide.

18. The chassis of claim 15, wherein the protecting layer comprises a first protecting layer portion formed on the metal reflecting layer and a second protecting layer portion formed on the first protecting layer portion, and wherein the first protecting layer portion has a greater refractive index than the second protecting layer portion.

19. The chassis of claim 15, wherein the protecting layer comprises a multi-layered structure having the protecting layer portions alternately deposited.

20. The chassis of claim 18, wherein the protecting layer comprises a multi-layered structure having an additional first protecting layer portion formed on the second protecting layer portion and an additional second protecting layer portion formed on the additional first layer protecting portion.

21. The chassis of claim 15, wherein a thickness of each of the protecting layer portions is a function of n times $\lambda/2$, where $\lambda$ and n represent a wavelength of reflected light and an integer, respectively.

22. The chassis of claim 15, wherein a thickness of an m-th protecting layer portion is about n times $N_m/N_{m+1} \times \lambda/2$, where $N_m$, $N_{m+1}$, $\lambda$ and n represent a refractive index of the m-th protecting layer portion, a refractive index of an (m+1)-th protecting layer portion that is formed on the m-th protecting layer portion, a wavelength of reflected light and an integer, respectively.

23. The chassis of claim 15, wherein a thickness of an o-th protecting layer portion that is an outermost protecting layer portion contacting air is about n times $N_o/N_{air} \times \lambda/2$, where $N_o$, $N_{air}$, $\lambda$ and n represent a refractive index of the o-th protecting layer portion, a refractive index of the air, a wavelength of reflected light and an integer, respectively.

24. The chassis of claim 15, wherein a thickness of the protecting layer is about 168 nm to about 405 nm.

25. The chassis of claim 24, wherein a thickness of the protecting layer is about 337.5 nm.

26. The chassis of claim 15, wherein the protecting layer comprises a metal oxide.

27. A liquid crystal display device comprising:
   a chassis including:
      a metal body layer;
      a metal reflecting layer formed on the metal body layer;
      an adhesive layer formed between the metal body layer and the metal reflecting layer to attach the metal body layer to the metal reflecting layer; and
      a protecting layer formed on the metal reflecting layer, wherein the protecting layer includes a plurality of protecting layer portions that have different refractive indexes from each other;
   a light source received in the chassis; and
   a liquid crystal display panel received in the chassis.

28. The liquid crystal display device of claim 27, wherein the metal reflecting layer comprises at least one of silver, aluminum, platinum or an alloy thereof.

29. The liquid crystal display device of claim 27, wherein the chassis comprises a bottom plate having the metal body layer, the adhesive layer, the metal reflecting layer and the protecting layer formed thereon, and a sidewall that is extended from the bottom plate.

30. The liquid crystal display device of claim 27, wherein the adhesive layer comprises a metal oxide.

31. The liquid crystal display device of claim 27, wherein the protecting layer comprises a first protecting layer portion formed on the metal reflecting layer and a second protecting layer portion formed on the first protecting layer portion, and wherein the first protecting layer portion has a greater refractive index than the second protecting layer portion.

32. The liquid crystal display device of claim 27, wherein the protecting layer comprises a multi-layered structure having the protecting layer portions alternately deposited.

33. The liquid crystal display device of claim 31, wherein the protecting layer comprises a multi-layered structure having an additional first protecting layer portion formed on the second protecting layer portion and an additional second protecting layer portion formed on the additional first layer protecting portion.

34. The liquid crystal display device of claim 27, wherein a thickness of each of the protecting layer portions is a function of n times $\lambda/2$, where $\lambda$ and n represent a wavelength of reflected light and an integer, respectively.

35. The liquid crystal display device of claim 27, wherein a thickness of the protecting layer is about 168 nm to about 405 nm.

36. The liquid crystal display device of claim 35, wherein a thickness of the protecting layer is about 337.5 nm.

37. The liquid crystal display device of claim 27, wherein the protecting layer comprises a metal oxide.

* * * * *